(12) United States Patent
Tobiasz

(10) Patent No.: US 6,354,188 B1
(45) Date of Patent: Mar. 12, 2002

(54) HYDRAULIC ACTUATOR, IN PARTICULAR FOR ENGAGING, A TUBE GUIDE INTEGRAL WITH AN EXTERNAL BODY

(75) Inventor: André Tobiasz, Epinay-sur-Seine (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/486,441

(22) PCT Filed: Jun. 29, 1999

(86) PCT No.: PCT/FR99/01557

§ 371 Date: Feb. 28, 2000

§ 102(e) Date: Feb. 28, 2000

(87) PCT Pub. No.: WO00/00753

PCT Pub. Date: Jan. 6, 2000

(30) Foreign Application Priority Data

Jun. 30, 1998 (FR) ............................................. 98 08311
Jun. 30, 1998 (FR) ............................................. 98 08313

(51) Int. Cl.[7] .......................... F01B 31/00; F16D 13/50; F16D 25/08
(52) U.S. Cl. ................... 92/107; 192/85 CA; 192/91 A
(58) Field of Search ........................ 192/85 CA, 91 A; 92/128, 114, 130 C, 131, 109, 107, 108

(56) References Cited

U.S. PATENT DOCUMENTS

| | | | | |
|---|---|---|---|---|
| 4,526,258 A | * | 7/1985 | Huber ................... | 192/91 A X |
| 4,561,531 A | * | 12/1985 | Young et al. ........... | 192/85 CA |
| 4,606,449 A | * | 8/1986 | Lederman ................. | 192/91 A |
| 5,743,370 A | * | 4/1998 | Thomire ................. | 192/85 CA |
| 5,810,145 A | * | 9/1998 | Thomire ................ | 192/85 CA |
| 6,085,885 A | * | 7/2000 | Herzig et al. ........... | 192/85 CA |
| 6,092,637 A | * | 7/2000 | Otto et al. ............... | 192/85 CA |

FOREIGN PATENT DOCUMENTS

| | | | |
|---|---|---|---|
| FR | 2 522 757 | 3/1982 | |
| FR | A-2.754.030 | 9/1996 | |
| FR | A-2.757.590 | 12/1997 | |
| FR | A-2.745.616 | 10/1998 | |
| JP | 1-216105 | * 8/1989 | .................. 92/107 |

* cited by examiner

Primary Examiner—Rodney H. Bonck
(74) Attorney, Agent, or Firm—Liniak, Berenato, Longacre & White

(57) ABSTRACT

The invention concerns a hydraulic, in particular clutching, actuator for receiving control data from a hydraulic circuit in the form of pressure variations. The concentric-type actuator (8) for hydraulic control comprises a fixed part (9) consisting of an external body (21) and a guide tube (22), both cylindrical and coaxial, and a piston (11) mounted sliding coaxially to the fixed part (9) and defining therein a chamber with variable volume (13) designed to be connected to the hydraulic control hydraulic transmitter, the external body (21) comprises on its internal face (35) a groove wherein is inserted a radial edge (31) with which the guide tube (22) is provided at one of its ends and which partially constitutes the variable volume chamber (13) bottom.

38 Claims, 3 Drawing Sheets

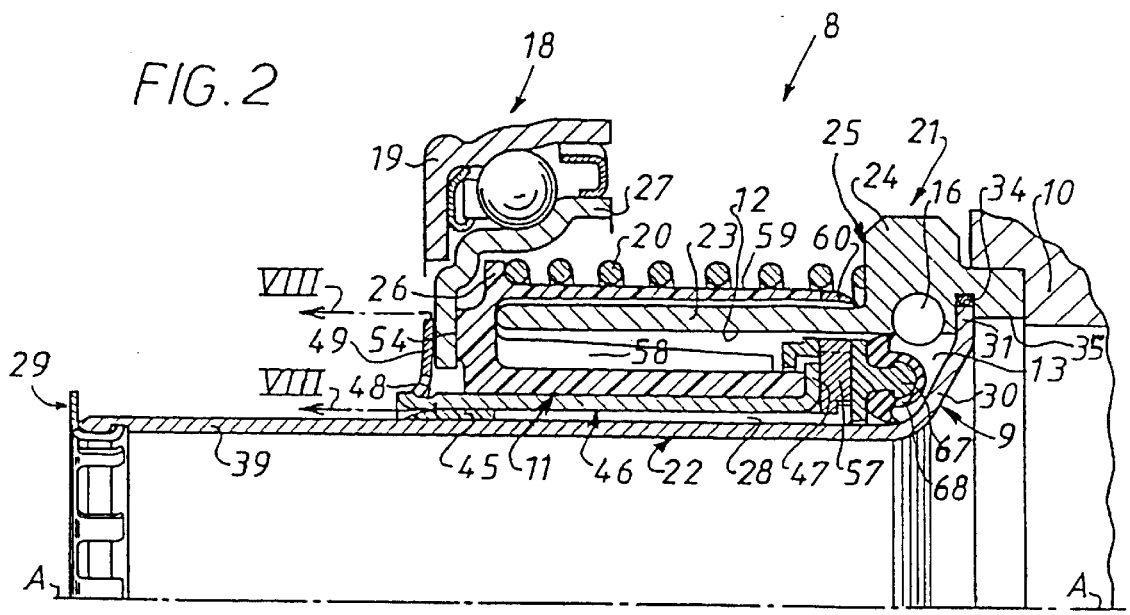
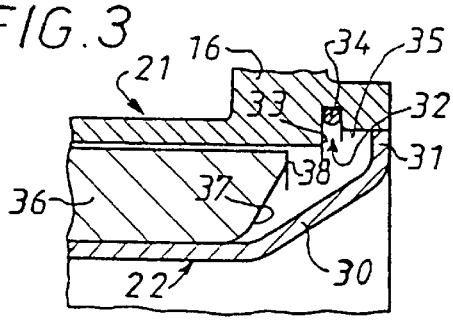
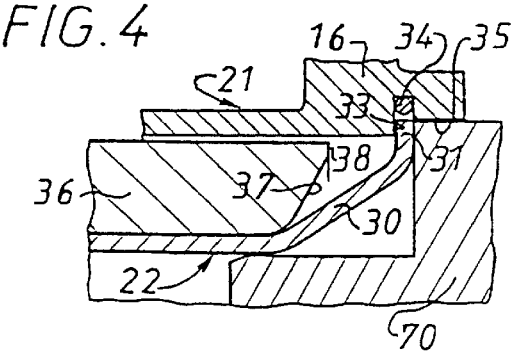
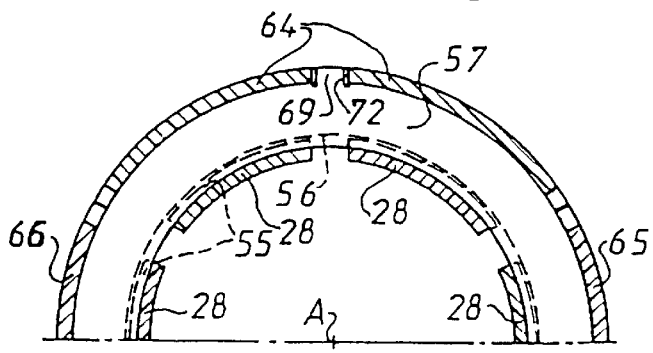
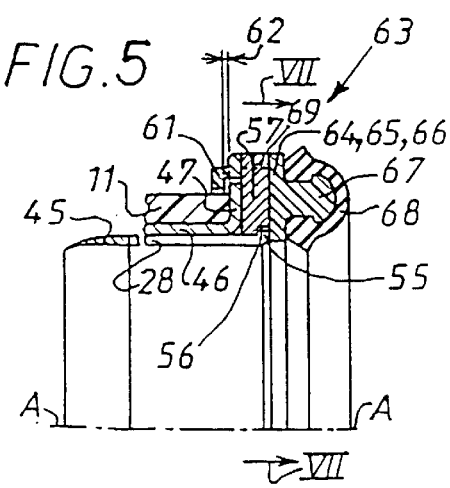

HYDRAULIC ACTUATOR, IN PARTICULAR FOR ENGAGING, A TUBE GUIDE INTEGRAL WITH AN EXTERNAL BODY

INTERNATIONAL PATENT APPLICATION NO. PCT/FR99/01557, PUBLICATION NO. WO00/00753.

This invention relates to a hydraulic circuit, in particular for a clutch. More particularly, it relates to a receiver device which is adapted to receive control information from a hydraulic circuit in the form of pressure variations, being more precisely a receiver of the concentric type.

Receiver devices of this kind are for example described in French patent No. 82 03485 published under the No. FR-A-2 522 757.

Such receivers generally comprise, firstly, a fixed part consisting of an external body and a guide tube which are cylindrical and coaxial with each other, and secondly, a piston which is mounted for sliding movement coaxially with the fixed part, and which defines therein a variable volume chamber adapted to be connected to the hydraulic emitter of the hydraulic control system.

In traditional concentric clutch receivers, the guide tube has a transverse flange which is assembled by seaming to the external body of the receiver. This arrangement involves risks of fracture of the seamed joint due to the pressure prevailing in the variable volume control chamber, if the force on the casing is removed. In general terms, the body is made of an aluminium based material, and seaming makes it brittle.

As to the invention, this envisages a receiver for a hydraulic circuit of this type which is able to overcome these disadvantages.

According to another object of the invention, the receiver is made both simple and cheap.

To this end, the invention proposes a receiver of the concentric type for a hydraulic control system, comprising, firstly, a fixed part consisting of an external body and a guide tube which are cylindrical and coaxial with each other, and secondly, a piston which is mounted for sliding movement coaxially with the fixed part, and which defines therein a variable volume chamber adapted to be connected to the hydraulic emitter of the hydraulic control system, the external body including, on its inner face, a groove in which there is inserted a radial edge which is formed in the guide tube at one of its ends, and which partially constitutes the base of the variable volume chamber.

It will be understood that the use of a guide tube grooved in this way enables the problems of seaming and embrittlement of the material, posed by the traditional method, to be removed while guaranteeing very good sealing of the variable volume chamber of the receiver and providing good strength against pressure. Such a grooved tube enables the intermediate stop member of the radial flange of the guide tube, described in the document FR-A-2 754 030, to be eliminated, so that the invention is inexpensive. In addition, there is no need to create any weakening whatever in order to perform the seaming operation as described in the document FR-A-2 754 030.

Preferably, the guide tube includes a cylindrical portion having a flare defined by a conical portion which terminates in the annular edge inserted in the groove of the external body.

This arrangement increases the strength of the guide tube against mechanical forces linked to pressure, and facilitates insertion of the tube into the groove of the external body. It also reduces the axial size of the guide tube and facilitates supply of fluid to the chamber.

In a preferred arrangement, the external body has a tubular portion and a collar portion within which the groove is formed.

So as to permit the grooved tube to be force-fitted, the annular edge of the guide tube is preferably of a diameter which is slightly greater than the diameter of the inner face of the external body.

In order to improve the sealing of the fitting of the guide tube in the groove in the external body, the receiver preferably includes an O-ring seal disposed at the base of the groove between the external body and the edge of the guide tube.

The invention makes good use of tooling which consists of a backing tool for fitting the fixed part of the concentric receiver, of generally cylindrical form and having a lateral face which consists of a frusto-conical segment and an annular segment.

Thus, a method of fitting the fixed part, using a backing tool such as that mentioned above, comprises steps of placing the guide tube in the axis of the external body, holding the annular edge of the guide tube in contact with the shoulder of the external body using the backing tool, and varying the angle of the conical portion using a punch, so as to bring the annular edge into the groove.

In accordance with another arrangement of the invention, the fixed part includes a feed inlet which is joined to the collar of the external body. The feed inlet is open through an aperture disposed in the inner face of the external body and formed substantially facing the conical portion of the guide tube. In this way; easier flow of the hydraulic fluid into the variable volume chamber of the receiver is obtained, while the latter is being put under pressure. It will be appreciated that this type of use with a grooved guide tube is applicable to a large number of receivers, in particular those described in the documents FR-A-2 754 030, FR-A-2 757 590. Because of the frusto-conical portion of the guide tube, the seal associated with the piston may be in the form of a toroidal cup which comes very close to the frusto-conical portion when the clutch is engaged.

Thus, in one embodiment, the head of the piston comprises at least two segments assembled in an annular arc by virtue of a positioning means and an annular ring carrying the said seal. This arrangement enables a piston head of complex cross section to be formed by moulding, and then to be assembled with a matching means, without being limited by the constraints imposed by stripping from the mould. The seal is a connector for assembling the segments together. Thus, thanks to the invention, a hydraulic receiver is obtained which is simple to make and of low selling price, which to this end requires in particular less machining than in the traditional method and is preferably made of light material.

In order to enable the piston head to be assembled with the other components of the concentric receiver, the segments in an annular arc have a step flange on their rear face.

In one embodiment, by virtue of these arrangements, the piston has a protective skirt terminated by an external lip seal, the form of which is adapted to slide on the tubular portion of the external body of the receiver.

This arrangement enables the conventional protective bellows to be omitted, and thereby simplifies assembly of the concentric receiver, while guaranteeing good protection for the piston against the entry of dust.

This arrangement is applicable to any kind of receiver of the concentric type, but it goes very well with the use of a guide tube which is grooved, because good concentricity is obtained between the guide tube and the external body, which limits the risk of jamming in the region of the lip seal of the protective skirt.

Accordingly, the receiver may include a cylindrical piston support tube which is terminated by an annular flange on the same side as the variable volume chamber, the said piston support tube being of a metallic nature and being mounted around the guide tube, with a means being provided for fixing the piston around the said piston support tube.

Thanks to this arrangement, there is separation of the functions between, firstly, that of supporting deformations due to temperature and mechanical forces due to the assembly means, and secondly, the function of transmission of thrust from the piston to the declutching member, namely the clutch release bearing.

The metallic piston support tube takes the thermal and mechanical forces from the assembly means, while the piston is so dimensioned as to transmit only the pressure forces.

The means for assembling the piston around the piston support tube is preferably an elastic autocentring ring in engagement on the piston support tube, such as is associated with a so-called autocentring clutch release bearing.

This simplifies assembly of the whole.

The autocentring ring is preferably in the form of a frusto-conical annular ring and has deformable nibs. The piston support tube has a shallow groove formed in its front end and arranged to receive the deformable nibs of the autocentring ring. In a preferred arrangement, the shallow groove of the piston support tube has a front flank which is inclined at a slope of about 45°. In a particular arrangement, the deformable nibs of the autocentring ring define a dihedral with the frusto-conical annular ring portion of the said autocentring ring.

In order to simplify its manufacture and reduce its selling costs and its weight, the piston is preferably made of plastics material.

The piston includes structural reinforcing ribs oriented in a direction substantially parallel to the axis of the piston. This arrangement enables a geometry to be chosen for the piston which gives it good structural strength, while forming apertures which reduce the material used and overall weight.

In a preferred arrangement, the receiver includes a lip seal placed around the guide tube under the piston support tube.

The lip seal is extended by a set of lugs constituting guide pads, which are carried by the guide tube and disposed under the piston support tube.

These arrangements facilitate movement of the piston support tube. The piston support tube, in combination with the piston, is thermally insulated.

In a preferred arrangement, the guide pads are six in number, each one subtending an angle of approximately 50°, and separated by a sector of 10° of angle along the guide tube.

It will be understood that in this way, any problems of thermal expansion are reduced, and that as a consequence, an arrangement which reduces vibrations is obtained.

Preferably, the guide pads terminate at their ends remote from the lip seal in radial flanges. This facilitates assembly of the guide pads with the piston head.

The guide pads and the lip seal are preferably made of plastics material. All of these arrangements are applicable to other types of receivers, but they are very well suited to the use of a type with a grooved guide, due to the good concentricity of the guide tube and small deformations of the guide tube under the effect of pressure variations. Further features of the invention will appear on a reading of the description and claims that follow.

The description and drawings of a preferred embodiment of the invention, which are given below, will enable the objects and advantages of the invention to be better understood. It will be clear that the said description is given by way of example, and is not limiting. In the drawings:

FIG. 2 is a half view in cross section of the receiver by itself, on an enlarged scale;

FIGS. 3 and 4 are detail scrap views of the guide tube before assembly to the outer body, by itself, on an enlarged scale;

FIG. 5 is a partial view in cross section showing the elements that define the head of the piston and the seal;

FIG. 6 is a view similar to FIG. 5, on a different plane of cross section;

FIG. 7 is a half view in cross section on VII—VII in FIG. 5;

Figure 1:
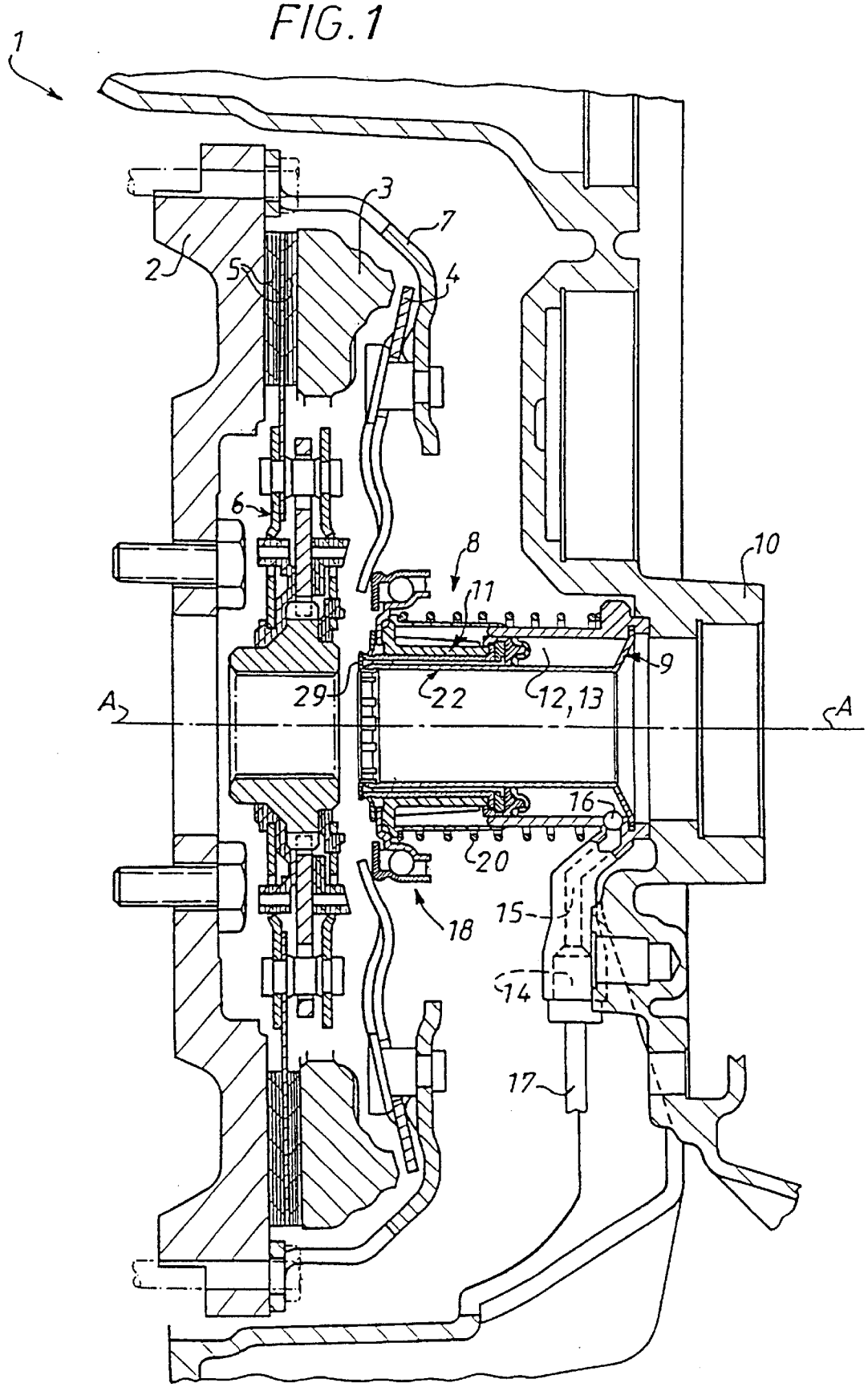
FIG. 1 is a view in cross section of a clutch assembly including a concentric hydraulic receiver in accordance with the invention.
Figure 8:
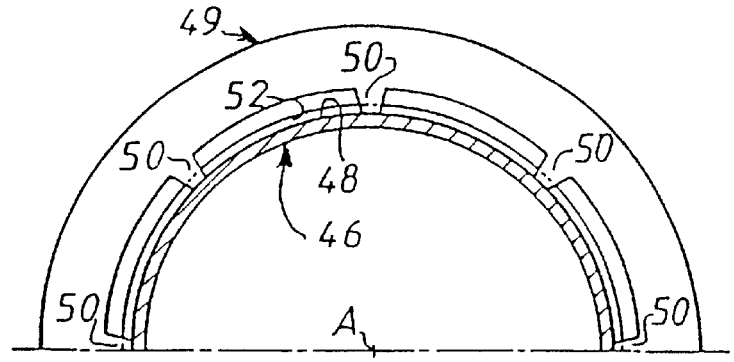
FIG. 8 is a view on VIII—VIII in FIG. 2.

FIG. 1 shows a view of a clutch in cross section. In this view, there will be seen the main elements of a conventional clutch 1, which in this example is of the push-to-release type, with, in particular, the cover plate 7, the reaction plate 2, and the pressure plate 3 on which the diaphragm 4 bears, in this example in the position in which the clutch is disengaged, the two said plates 2 and 3 being arranged to grip the friction liners 5 of a friction disc 6 having an internally splined hub. Clutches of this type are well known per se, and are for example of the same type as that which is described in detail in the document FR-A-2 730 532.

The receiver 8, which forms part of the declutching control system for disengaging the clutch, is of the concentric type in this example, and can be seen in FIG. 1 in the position in which the clutch is disengaged or declutched, while in FIG. 2 it is shown in the rest position in which the clutch is engaged.

In general terms, in the following description, the term "front" corresponds to the left hand side of the components in FIGS. 1 to 6, while the term "rear" corresponds to the right hand part of the same components in the same Figures.

In the known way, the receiver 8 comprises two annular parts in piston and cylinder relationship, namely a fixed part 9 by which the receiver 8 is mounted on a fixed structure such as the casing 10 of the gearbox, and a movable part consisting of a piston 11 of generally annular form which slides axially, partly within a cavity 12, which is also annular and which is defined within the hollow fixed part 9.

The cavity 12 is blind and is arranged to be pressurised and depressurised. The control fluid in this example is oil.

A variable volume chamber 13 is thus defined by the piston 11 within the cavity 12.

In order to vary the internal volume of the said variable volume chamber 13, the fixed part 9 includes a feed inlet 14 connected to the cavity 12. The feed inlet 14 is extended by an internal duct 15 which is open through an aperture 16 in the base of the cavity 12 in which the variable volume chamber 13 is defined.

The feed inlet 14 is connected through a duct 17 to the emitter (not shown) of the declutching control system. The said emitter is actuated in the known way by an actuator of any kind (not shown), such as a clutch pedal or a motorised actuator, which may for example be electrical and which is connected to a computer so as to act on the piston of the emitter in accordance with predetermined programmes.

When the control fluid of the variable volume chamber 13 is pressurised from the emitter, the piston 11 is caused to be displaced towards the left in FIG. 2, in such a way that the volume of the variable volume chamber 13 increases. In the position shown in FIG. 1, the piston 11 has come by its maximum amount out of the cavity 12, with the variable volume chamber 13 then being at its maximum volume.

The piston 11 actuates, during its travel, a clutch release bearing 18 which exerts a thrust on the inner ends of the fingers of the diaphragm 4, to disengage the clutch as can be seen in FIG. 1.

As the pressure in the variable volume chamber 13 is reduced, its volume diminishes, with the fluid returning through the duct 17 to the emitter; the piston 11 is then displaced to the right in FIG. 1 under the return effect of the diaphragm 4, which returns to its rest position, in which, bearing on the cover plate 7 which is fixed axially to the reaction plate 2, it biases the pressure plate 3 elastically towards the reaction plate 2 so as to grip the liners 5 between the two plates. The piston reaches its final, rest, position as is shown in FIG. 2.

The clutch release bearing 18 is the actuating element which acts in a thrust mode on the fingers of the diaphragm 4, and in this example it consists of a ball bearing, the rotating outer ring 19 of which is in permanent contact with the fingers of the diaphragm 4 by virtue of a preloading spring 20 which acts between the fixed part 9 and the piston 11, which cooperates with the non-rotating inner ring 27 of the bearing 18, under the conditions to be described below.

The fixed part 9 of the receiver 8 is secured in a known way to the gearbox casing 10, for example by means of ears which are not shown in the drawings.

In the conventional way, and for example in the manner described in the document FR-A-96 02571 published under the No. FR-A-2 745 616, the fixed part 9 consists of two coaxial main elements, which are, firstly, an external body 21 which is made of a mouldable material such as aluminium, and a concentric guide tube 22.

The external body 21 has a tubular front portion 23 and a thicker rear portion in the form of a collar 24; the fluid aperture 16, which is joined through the internal duct 15 to the feed duct 17, is open in the inner face of the collar 24.

The guide tube 22 is preferably made of a metallic material, and constitutes a member for supporting and guiding the piston 11. As can be seen in FIG. 2, the guide tube 22, consisting mainly of a cylindrical portion 39, is longer in the axial direction than the external body 21. It is of low thickness, which enables the radial size of the receiver 8 to be reduced. The input shaft of the gearbox, not shown, extends through the tube 22.

The guide tube 22 has in its rear portion, at the end of its cylindrical portion 39, a flare defined by a conical portion 30 which terminates in a transverse annular edge 31. This annular edge 31 is fixed to the external body 21 so as to close off the cavity 12 and to define the base of the latter; for this purpose, the external body 21 has on its inner face 35 a groove 32, FIG. 3, and is stepped internally in diameter in such a way as to create a shoulder 33 which extends internally one of the flanks of the groove 32, which in this example is the front flank.

An O-ring seal 34 of known type is disposed in the base of the groove 32, so as to seal the connection, and therefore also the variable volume chamber 13.

The annular edge 32 of the guide tube 22, which has a diameter before it is mounted, FIG. 3, substantially similar to that of the inner face 35 of the external body 21, which is located behind the shoulder 33, is inserted in the groove 32 until the O-ring seal 34 is compressed, in the manner described below.

During its fitting in position in the groove 32, and after the guide tube 22 has been placed on the axis of the external body 21 as can be seen in FIG. 3, the guide tube 22 has a form such that, before it is mounted, its annular edge 31 is aligned with the inner face 35 of the external body 21.

The annular edge 31 is then brought into contact with the shoulder 33 of the external body 21, FIG. 4, and is held in that position by a backing tool 70.

The conicity of the conical portion 30 is then changed, using a cylindrical tool 36 which has a face that includes a frusto-conical segment 37 and an annular segment 38, so as to cause the annular edge 31 to enter into the groove 32 by a variation in angle and therefore an increase in the external diameter of the annular edge 31.

As can be seen in FIG. 2, the aperture 16 for feeding the variable volume chamber 13 is disposed axially in substantial alignment with the conical portion 30 of the guide tube 22, which defines the minimum volume of the said chamber; this arrangement limits the axial size of the receiver 8, and facilitates good flow of the control fluid into the chamber 13, in particular because of the portion 30.

The front face 25 of the collar (which is on the left in FIG. 2) of the external body 21 serves as an abutment for the preloading spring 20, the other end of which bears on a transverse flange 26 formed on the piston 11 at its front end.

A lip seal 45, which helps to prevent penetration of dust into the variable volume chamber 13, surrounds the guide tube 22. It carries a set of lugs which extend axially and which constitute guide pads 28; the lip seal 45 and its guide pads 28 are fixed axially to the piston 11 and are arranged to slide on the outer surface of the guide tube 22 and to guide the piston 11.

Each of the guide pads 28, of which there are six in this example, subtends an angle of about 50°, and they are separated by sectors of 10° angle along the guide tube 22 (see FIG. 7); the lip seal 45 and the guide pads 28 are integral with each other and formed in plastics material having good sliding properties. The number of pads 28 depends on the application. The guide pads 28 terminate at their end remote from the lip seal 45 in radial edges 55, each of which enters into a recess 56 (FIGS. 5 and 6) which is formed at the inner periphery of a steel thrust ring 57 fixed to the piston 11, and the purpose of which will appear below.

The division into a plurality of guide pads 28 enables thermal deformation to be better supported.

Between the piston 11 and the lip seal 45 there is inserted a steel piston support tube 46, FIG. 2, which is substantially cylindrical but which is terminated at its rear end by an annular flange 47 which is disposed, in the assembled configuration of the receiver 8 as can be seen in FIG. 2, between the rear face of the piston 11 and the thrust ring 57.

The piston support tube 46 is made, in the example described here but without limitation, of steel, which enables it to support mechanical forces without excessive deformation. In particular, the piston support tube 14 is adapted to take the forces transmitted by an autocentring ring 49 which will be described below.

As a result, the piston 11 is made of plastics material, which reduces costs and, for example, avoids any need for machining a metal piston, as the piston 11 can in this case be of moulded construction. The piston 11 and the lip seal 49 with its pads 28 provide thermal insulation for the piston support tube 46, which is deformed very little. The risks of jamming of the piston 11 are reduced by the presence of the tube 46 and the pads 28. The main function of the piston 11 is then to transmit the mechanical forces set up in the variable volume chamber 13, along the axis AA to the release bearing 18.

For this purpose, in the embodiment which is shown here by way of example, the piston 11 has structural reinforcing ribs 58, which are oriented axially in a direction substantially parallel to the axis AA and extend towards the rear end of the piston 11 from its front face 54, with dimensions which are suitable to enable the piston 11 and its ribs 58 to pass into the cylindrical space defined between the piston support tube 46 and the tubular portion 23 of the external body 21.

The front face 54 of the piston 11 is substantially annular in form and is accordingly arranged to receive the clutch release bearing 18 in engagement on it.

In order to provide protection against the input of pollutants into the variable volume chamber 13, the piston 11 has a protective skirt 59 which has the form of a thin annular cylindrical wall on the axis AA, and the free end of which is configured as an external lip seal 60. The protective seal 59 plays its part during the fitting of the external body 21 around the tubular portion 23 and inside the preloading spring 20, the external lip seal 60 being adapted to engage frictionally against the external body 21. The preloading spring 20 bears on the transverse flange 26 which is carried by the piston 11 and which extends radially at the root of the protective skirt 59.

Such a protective skirt 59 preferably replaces the bellows which is usually employed in conventional concentric receivers.

As can readily be seen in FIG. 2, and as will be clear from the above description, the piston 11 therefore has a U-shaped cross section surrounding the piston support tube 46, with a first branch of the U, having the greater structural strength and constituting the piston proper, being disposed between the piston support tube 46 and the tubular portion 23 of the external body 21, while a thin external second branch constitutes the protective skirt 59, the end 60 of which sweeps over the external face of the tubular portion 23 of the external body 21, so as to protect the internal portion of the receiver 8 against contamination.

The receiver 8 has, in a known way, an axial and radial clearance 62, FIG. 5, between the piston head 63 to be described below, and the piston 11 proper, so as to take into account any variations in position of the fingers of the diaphragm 4 for example.

In the present invention, the piston head 63 consists, FIGS. 5 and 6, of the steel thrust ring 57 already mentioned, which is positioned to the rear (i.e. on the right in the Figures) of the annular flange 47 of the piston support tube 46, together with a plurality of segments 64, 65, 66, of which there are three in this example and which are of annular form, each one having a profile, again annular, in the form of a peg 67 which is oriented axially towards the variable volume chamber 13. These segments 64, 65, 66 have on their rear face a step flange 61 which is carried by an axial lug 71. The form of the piston head 63 in a plurality of annular segments 64, 65, 66 is justified by the fact that it is not easy to form it by moulding in one annular piece which includes both the profile, in the form of the pegs 67, and the step flange 61.

During mounting of the segments 64, 65, 66 around the thrust ring 57, the step flanges 61 of the segments 64, 65, 66 embrace and trap the annular flange 47 of the piston support tube 46, so limiting any possible displacement of the piston support tube 46 and therefore of the piston 11, with an axial clearance 62 defined by the step flange 61, with respect to the piston head 63.

A generally toroidal cup seal 68 is disposed on the peg-shaped profiles 67 of the three segments 64, 65, 66, and it seals the variable volume chamber 13. The seal 68 constitutes a connector assembling the segments 64, 65, 66 together.

The steel thrust ring 57 includes locating lugs 69, of which there are the same number as the segments, three in this case, and which are arranged to facilitate the positioning of the respective said segments. These positioning lugs 69 cooperate with holes 72, FIG. 6, which are formed in the segments 64, 65, 66, so as to ensure that they are accurately positioned. Once located in their axial positions, the latter have a circumferential clearance of the order of about 0.1 mm between each one and the next.

The piston support tube 46 has an axial length which is slightly greater than that of the piston 11, so as slightly to extend beyond the front end of the latter, whereby to enable the so-called autocentring ring 49 to be fitted. To this end, the piston support tube 46 has at its front end, FIG. 2, a hollow groove 48 which can be seen best in FIG. 9, and the function of which is to act as a stop groove for the autocentring ring 49. This shallow groove 48 preferably has a non-vertical front flank 52, which is for example inclined at 45°.

Figure 9:
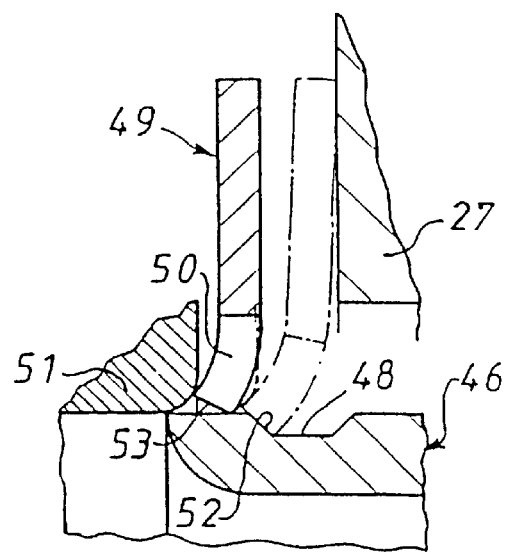
FIG. 9 is a partial view in cross section showing the positioning of the piston stop ring.

The autocentring ring 49, of the Belleville type, is slightly frusto-conical before being fitted, as indicated in full lines in FIG. 9. Its thickness is for example 0.5 to 0.6 mm. It has a set of elastically deformable nibs 50 on its inner periphery, which are spaced apart at regular circumferential intervals, for example all at 45°, and defining, with the annular portion of the autocentring ring 49, a curved dihedral which is identical for all the nibs.

During fitting of the clutch release bearing 18 on the receiver 8, the autocentring ring 49 is placed in the axis of the piston support tube 46, and is then pushed with the aid of a ram 51, as can be seen in FIG. 9, into the groove 48, in which the ends of the nibs 50 take their place by deformation.

The Belleville ring is so chosen that it has a curve of deflection as a function of applied force which includes a flat portion corresponding to a possible severe deformation by maintaining a specific constant applied force on the ring. It is this feature which is used to deform the nibs 50 in this part of the characteristic curve during fitting. The non-rotating ring 27 of the release bearing 18, bearing on the front face 54 of the piston, serves as a backing tool during this operation. After the fitting operation, the nibs 50 bear through their end portion 53 on the front flank 52 of the groove 48 in the piston support tube 46. The autocentring ring 49 then exerts a force on the non-rotating ring 27 of the clutch release bearing, thereby causing the desired blocking of axial movement of the release bearing 18, which retains freedom of radial displacement for centring it in the known way.

It will be understood that assembly of the piston 11 and piston support tube 46 is completed by the autocentring ring 49, which serves not only to block axial movement of the release bearing 18 against the piston, but also to hold the piston 11 against the annular flange 47 of the piston support tube 46. The said ring 49 remains oriented generally transversely after assembly, with only the nibs 50 being deformed. In this example, deformation of the ring 49 has been exaggerated.

Figure 10:
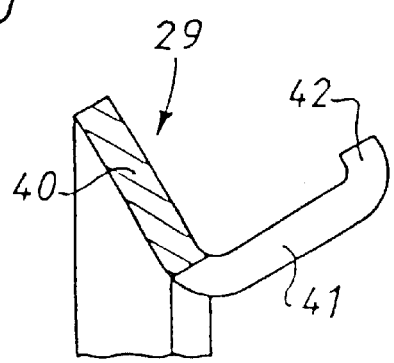
FIG. 10 is a partial view in cross section of the piston stop abutment.

With reference to FIGS. 1 and 2, it will be seen that the guide tube 22 carries at its front end, on the left in these Figures, an end stop 29 which is arranged to limit the axial travel of the piston 11. The end stop 29 consists, see FIG. 10, of a Belleville type ring comprising a frusto-conical annular ring 40, the inner portion of which is extended by lugs 41 which extend on the convex side with respect to the ring portion 40, with which they make an angle, in this example of 90°; each of the lugs 41 terminates in a terminal hook-shaped flange 42 on the same side as the ring portion 40.

The guide tube 22 has at the front end of its cylindrical portion 39 a groove 43 which is formed in its internal face 44 and which is adapted to receive the flanges 42 of the lugs 41 of the end stop 29.

During fitting of the end stop 29, the frusto-conical ring portion 40 is tilted, with the aid of a tool, to its flat configuration, and the lugs 41 are introduced into the guide tube 22 until the flanges 42 of the lugs 41 are positioned within the groove 43 of the guide tube 22.

Figure 11:
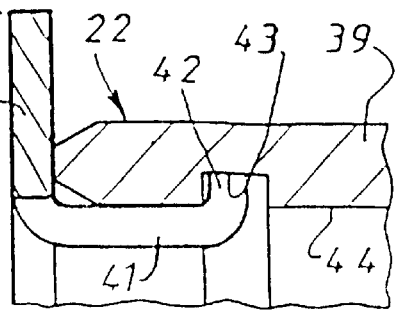
FIG. 11 is a partial view in cross section showing the piston stop abutment in a working position.

In this position, which can be seen in FIG. 11, the frusto-conical ring portion 40 takes the form of a substantially flat ring at right angles to the axis of the guide tube 22.

It will be appreciated that the outer periphery of the guide tube 22 is smooth at its front end. Due to the end stop 29, the axial length of the tube 22 can be reduced, or the guiding length of the latter can be increased.

The operation of the receiver 8 in accordance with the invention is identical to that of a conventional concentric receiver, and will not be set forth here.

Numerous variations may be considered, according to the circumstances of use.

In another version of the method of fitting the guide tube 22 in the groove 32 of the external body 21, the guide tube 22 has an initial diameter, before being fitted, which is slightly greater than that of the internal face 35 of the external body 21, and shaving occurs while it is being positioned in the groove 32.

The scope of the present invention is not limited to the details of the embodiments described above by way of example, but, on the contrary, it extends to modifications within the capability of the person skilled in the art.

What is claimed is:

1. A receiver (8) of the concentric type for a hydraulic control system, comprising, firstly, a fixed part (9) consisting of an external body (21) and a guide tube (22) which are cylindrical and coaxial with each other, and secondly, a piston (11) which is mounted for sliding movement coaxially with the fixed part (9) and which defines therein a variable volume chamber (13) adapted to be connected to a hydraulic emitter of the hydraulic control system, wherein the external body (21) includes, on an inner face thereof (35) a groove (32), a radial edge (31) formed at one end of the guide tube (22) being press fit into the groove and dimensioned to snugly fit between opposing surfaces of the groove to establish the press fit, and the radial edge of the guide tube partially constitutes the base of the variable volume chamber (13).

2. A receiver according to claim 1, characterised in that the guide tube (22) includes a cylindrical portion (39) having a flare defined by a conical portion (30) which terminates in the annular edge (31) inserted in the groove (32) of the external body (21).

3. A receiver according to claim 1, characterised in that the external body (21) has a tubular portion (23) and a collar portion (24) within which the groove (32) is formed.

4. A receiver according to claim 3, characterised in that it includes a feed inlet (14) which is connected to the collar (24) of the external body (21).

5. A receiver according to claim 4, characterised in that the feed inlet (14) is open through an aperture (16) in the inner face (35) of the external body (21), formed substantially facing the conical portion (30) of the guide tube (22).

6. A receiver according to claim 1, characterised in that the edge (31) of the guide tube (22) has a diameter, before being fitted, which is substantially identical to the diameter of the inner face (35) of the external body (21).

7. A receiver according to claim 1, characterised in that it includes an O-ring seal (34) disposed at the base of the groove (32) between the external body (21) and the edge (31) of the guide tube (22).

8. A receiver according to claim 1, characterised in that an end stop (29), fixed to the internal face (44) of the guide tube (22), limits the course of travel of the piston (11).

9. A receiver according to claim 8, characterised in that the end stop (29) consists of a ring of the Belleville type comprising an annular ring portion (40) and lugs (41) at right angles to the said ring portion, the ring portion (40) being of frusto-conical form in the rest position of the Belleville ring, and substantially flat once it is mounted on the guide tube (22), with each of the lugs (41) having a hook-shaped terminal flange (42), the terminal flange (42) assuming positions, during fitting, within a groove (43) which is formed on the internal face (44) of the front part of the cylindrical portion (39) of the guide tube (22), and which has a depth corresponding to the size of the hooks (42) of the lugs (41) of the Belleville ring.

10. A receiver according to claim 1, characterised in that it includes a cylindrical piston support tube (46) which is terminated by an annular flange (47) on the same side as the variable volume chamber (13), the said piston support tube (46) being metallic and being mounted around the guide tube (22), with a means being provided for fixing the piston (11) around the said piston support tube (46).

11. A receiver according to claim 10, characterised in that the means for fixing the piston (11) around the piston support tube (46) is an autocentring ring (49) in engagement on the piston support tube (46).

12. A receiver according to claim 11, characterised in that the autocentring ring (49) is in the form of a frusto-conical annular ring and has deformable nibs (50).

13. A receiver according to claim 12, characterised in that the piston support tube (46) has a shallow groove (48) formed in its front end and arranged to receive the deformable nibs (50) of the autocentring ring (49).

14. A receiver according to claim 13, characterised in that the shallow groove (48) of the piston support tube (46) has a front flank (52) which is inclined at a slope of about 45°.

15. A receiver according to claim 13, characterised in that the deformable nibs (50) of the autocentring ring (49) define a dihedral with the frusto-conical annular ring portion of the said autocentring ring (49).

16. A receiver according to claim 10, characterised in that the piston (11) is made of plastics material.

17. A receiver according to claim 16, characterised in that the piston (11) includes structural reinforcing ribs (58) oriented in a direction substantially parallel to the axis (AA) of the piston (11).

18. A receiver according to claim 16, characterised in that it includes a lip seal (45) placed around the guide tube (22) under the piston support tube (46).

19. A receiver according to claim 18, characterised in that the lip seal (45) is extended by a set of lugs constituting guide pads (28), which are carried by the guide tube (22) and disposed under the piston support tube (46).

20. A receiver according to claim 19, characterised in that the guide pads (28) are six in number, each one subtending an angle of approximately 50°, and separated by a sector of 10° of angle along the guide tube (22).

21. A receiver according to claim 19, characterised in that the guide pads (28) terminate at their ends remote from the lip seal (45) in radial flanges (55).

22. A receiver according to claim 19, characterised in that the guide pads (28) and the lip seal (45) are made of plastics material.

23. A receiver according to claim 1, characterised in that the piston (11) has a protective skirt (59) terminated by an external lip seal (60), the form of which is adapted to slide on the tubular portion (23) of the external body (21) of the receiver (8).

24. A receiver according to claim 23, characterised in that the protective skirt (59) is in the form of a thin cylinder having an axis (AA) identical to the axis of the external body (21).

25. A receiver according to claim 23, characterised in that it includes, at the root of the protective skirt (59), a transverse flange (26).

26. A receiver according to claim 23, characterised in that it includes a preloading spring (20) mounted between the external face (25) of the external body (21) and the front portion of the piston (11).

27. A receiver according to claim 26, characterised in that the preloading spring (20) is disposed outside the protective skirt (59), in engagement against the outer face (25) of the external body (21) and the transverse flange (26) of the piston (11).

28. A receiver according to claim 23, characterised in that the protective skirt (59) is made of plastics material.

29. A receiver according to claim 1, characterised in that the head (63) of the piston (11) comprises at least two segments (64, 65, 66) assembled in an annular arc by virtue of a positioning means (57) and an annular ring carrying a seal (68) adapted to seal the variable volume chamber (13).

30. A receptor according to claim 29, characterised in that the piston head (63) comprises three segments (64, 65, 66) arranged in an annular arc.

31. A receiver according to claim 29, characterised in that each of the segments (64, 65, 66) in an annular arc carries a profile in the form of a peg (67) which is oriented towards the variable volume chamber (13).

32. A receiver according to claim 29, characterised in that the means for positioning the segments (64, 65, 66) in an annular arc is a metallic thrust ring (57).

33. A receiver according to claim 32, characterised in that the thrust ring (57) includes positioning lugs (69) cooperating with holes formed in the segments (64, 65, 66) in an annular arc so as to position them accurately.

34. A receiver according to claim 32, characterised in that the thrust ring (57) includes a recess (56) on its inner periphery designed to accommodate radial flanges (55) of the guide pads (28).

35. A receiver according to claim 29, characterised in that the segments (64, 65, 66) in an annular arc have a step flange (61) on their rear face.

36. A receiver according to claim 35, characterised in that the piston support tube (46) has a transverse flange (47) disposed inside the step flange (61).

37. A receiver according to claim 36, characterised in that the step flange (61) has a width greater than the thickness of the transverse flange (47) of the piston support tube (46), thereby defining an annular clearance (62) of the piston support tube (46) in its housing within the step flange (61) of the piston head (63).

38. A receiver according to claim 29, characterised in that the seal (68) is in the form of a toroidal cup.

* * * * *